United States Patent
Miao et al.

(10) Patent No.: US 11,012,669 B2
(45) Date of Patent: May 18, 2021

(54) PROJECTION DEVICE AND CONTROL METHOD THEREOF

(71) Applicant: Coretronic Corporation, Hsin-Chu (TW)

(72) Inventors: Yun-Lin Miao, Hsin-Chu (TW); Wen-Chang Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/937,595

(22) Filed: Jul. 24, 2020

(65) Prior Publication Data

US 2021/0037220 A1    Feb. 4, 2021

Related U.S. Application Data

(60) Provisional application No. 62/880,082, filed on Jul. 30, 2019.

(30) Foreign Application Priority Data

Aug. 29, 2019  (CN) .......................... 201910806005.6

(51) Int. Cl.
  *G03B 21/14* (2006.01)
  *H04N 9/31* (2006.01)
  *G01C 21/36* (2006.01)

(52) U.S. Cl.
  CPC .......... *H04N 9/312* (2013.01); *G01C 21/365* (2013.01); *G03B 21/145* (2013.01); *H04N 9/3185* (2013.01)

(58) Field of Classification Search
  CPC .... H04N 9/312; H04N 9/3185; G03B 21/145; G01C 21/365

(Continued)

(56) References Cited

U.S. PATENT DOCUMENTS 5,483,299 A    1/1996  Minoura
6,634,757 B2   10/2003 Asakawa
(Continued)

FOREIGN PATENT DOCUMENTS

CA    2357608   9/2004
CN    1991571   7/2007
(Continued)

OTHER PUBLICATIONS

Machine Translation of DE 102006036061 A1 (Year: 2020).*

(Continued)

*Primary Examiner* — Jerry L Brooks
(74) *Attorney, Agent, or Firm* — JCIPRNET

(57) ABSTRACT

A projection device adapted to be placed on a vehicle and a control method of the projection device are provided. The projection device includes a storage device storing image data of at least one projection image, a projection module, a distance detection device measuring a projection distance from the distance detection device to a projection plane, and a control device electrically connected to the storage device, the projection module, and the distance detection device. The control device enables the projection module to project the projection image and controls brightness or size of the projection image according to the corresponding projection distance. The projection device is activated by opening a door of the vehicle, and power of the projection device comes from the vehicle. The projection image can be adjusted according to the projection distance to maintain stable brightness and the size of the projection image.

10 Claims, 4 Drawing Sheets

Opening a door of a vehicle to activate a projection device, power of the projection device coming from the vehicle — S510

Measuring a projection distance from a distance detection device to a projection plane by the distance detection device — S520

Projecting at least one projection image by a projection module, wherein a control device controls a brightness or a size of the at least one projection image according to the corresponding projection distance — S530

(58) Field of Classification Search
USPC .......................................................... 353/31
See application file for complete search history.

(56) References Cited

U.S. PATENT DOCUMENTS

| | | |
|---|---|---|
| 7,278,744 B2 | 10/2007 | Nonaka |
| 7,300,160 B2 | 11/2007 | Nakamura |
| 7,545,937 B2 | 6/2009 | Rumreich |
| 7,614,753 B2 | 11/2009 | Zavarehi et al. |
| 7,866,823 B2 | 1/2011 | Asai |
| 8,506,093 B2 | 8/2013 | Kato |
| 9,004,698 B2 | 4/2015 | Kilcher et al. |
| 9,215,431 B2 | 12/2015 | Nakashin |
| 9,588,408 B1 | 3/2017 | Linnell |
| 9,664,376 B2 | 5/2017 | Abe et al. |
| 10,321,104 B2 | 6/2019 | Ma |
| 2005/0094110 A1 | 5/2005 | Nakamura |
| 2007/0252955 A1 | 11/2007 | Asai |
| 2008/0212039 A1* | 9/2008 | Taylor .................... G03B 21/14 353/79 |
| 2009/0027571 A1 | 1/2009 | Amano |
| 2009/0174638 A1* | 7/2009 | Brown Elliott .......... G09G 5/06 345/88 |
| 2009/0219493 A1* | 9/2009 | Okubo ............... G03B 21/2053 353/85 |
| 2011/0299044 A1 | 12/2011 | Yeh et al. |
| 2012/0069415 A1 | 3/2012 | Freeman et al. |
| 2012/0113107 A1 | 5/2012 | Jang |
| 2016/0351133 A1 | 12/2016 | Kim et al. |
| 2017/0068153 A1 | 3/2017 | Ikeura et al. |
| 2017/0229099 A1 | 8/2017 | Mito |
| 2018/0091784 A1 | 3/2018 | Dutton et al. |
| 2018/0143443 A1 | 5/2018 | Fujita |
| 2018/0226055 A1 | 8/2018 | Raymann et al. |
| 2019/0096297 A1 | 3/2019 | Cary |
| 2020/0081329 A1 | 3/2020 | Cheng |
| 2020/0177854 A1 | 6/2020 | Miao |
| 2020/0177855 A1 | 6/2020 | Miao et al. |

FOREIGN PATENT DOCUMENTS

| | | | |
|---|---|---|---|
| CN | 102109745 | 6/2011 | |
| CN | 106612421 | 5/2017 | |
| CN | 106791745 | 5/2017 | |
| CN | 107023793 | 8/2017 | |
| CN | 108737802 | 11/2018 | |
| CN | 108761980 | 11/2018 | |
| CN | 208264098 | 12/2018 | |
| CN | 209215850 | 8/2019 | |
| DE | 102006036061 A1 * | 2/2007 | ............... B60Q 1/24 |
| DE | 102013016347 | 4/2014 | |
| EP | 0454451 | 10/1991 | |
| EP | 1235428 | 8/2002 | |
| FR | 3048786 | 9/2017 | |
| JP | S62287288 | 12/1987 | |
| JP | 2013142846 | 7/2013 | |
| TW | 201232155 | 8/2012 | |

OTHER PUBLICATIONS

"Search Report of Europe Counterpart Application", dated Nov. 24, 2020, p. 1-p. 9.
"Office Action of U.S.A. Related Application, U.S. Appl. No. 16/698,961", dated Mar. 31, 2020, p. 1-p. 18.
"Office Action of China Related Application No. 201811454301.6", dated Mar. 1, 2021, pp. 1-12.
"Office Action of China Related Application No. 201811454287.X", dated Mar. 1, 2021, pp. 1-9.

* cited by examiner

PROJECTION DEVICE AND CONTROL METHOD THEREOF

CROSS-REFERENCE TO RELATED APPLICATION

This application claims the priority benefits of the U.S. provisional application Ser. No. 62/880,082, filed on Jul. 30, 2019 and the China application serial no. 201910806005.6, filed on Aug. 29, 2019. The entirety of each of the above-mentioned patent applications is hereby incorporated by reference herein and made a part of this specification.

BACKGROUND OF THE INVENTION

1. Field of the Invention

The invention relates to a projection technology, and more particularly to a projection device and a control method thereof.

2. Description of Related Art

At present, many vehicles are equipped with puddle lamps as auxiliary illumination sources, whereby people who get in or out of the vehicles can pay attention to ground conditions and can be protected from accidentally treading on dangerous ground or dirt. For aesthetic purposes or indication functions, some light beams emitted from the puddle lamps may form a pattern or an image on the ground. According to the related art, if the same puddle lamp is installed on different models of vehicles, such as a sedan, a sports car, a truck, and so on, due to the height difference of different vehicle models, the pattern projected by the puddle lamp that is farther from the ground is of greater size but smaller brightness, and the pattern projected by the puddle lamp that is closer to the ground is of smaller size but greater brightness. In other words, the projection image is changed in response to different heights of the chassis of the vehicles, and thus uniformity and image quality of the projection image cannot stay consistent.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projection device and a control method thereof capable of adjusting a projection image according to a projection distance, so as to maintain stable brightness and size of the projection image.

An embodiment of the invention provides a projection device adapted to be disposed on a vehicle. The projection device includes a storage device, a projection module, a distance detection device, and a control device. The storage device stores image data of at least one projection image. The distance detection device measures a distance from the distance detection device to a projection plane. The control device is electrically connected to the storage device, the projection module, and the distance detection device. The control device enables the projection module to project the at least one of projection image according to the corresponding projection distance and controls a brightness or a size of the at least one projection image, wherein a door of the vehicle is opened to activate the projection device, and power of the projection device comes from the vehicle.

Another embodiment of the invention provides a control method of a projection device. The projection device is adapted to be disposed on a vehicle and includes at least one distance detection device, a control device, and a projection module. The control method includes steps of: opening a door of the vehicle to activate the projection device activate, and power of the projection device comes from the vehicle; measuring a projection distance from the distance detection device to a projection plane by the distance detection device; projecting at least one projection image by the projection module, wherein the control device controls a brightness or a size of the at least one projection image according to the corresponding projection distance.

Based on the above, one or more embodiments of the invention provide a projection device and a control method thereof. The projection device has the distance detection device to measure the projection distance, and the control device controls the brightness or the size of the at least one projection image generated by the projection module according to the corresponding projection distance. As such, when the projection distance is short, the projection image generated by the projection device having the high luminous flux may be prevented from being excessively bright, thus protecting human eyes from fatigue and achieving energy saving effects. Besides, through the control of the size of the projection image, the overall brightness and the size of the projection image can remain consistent.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
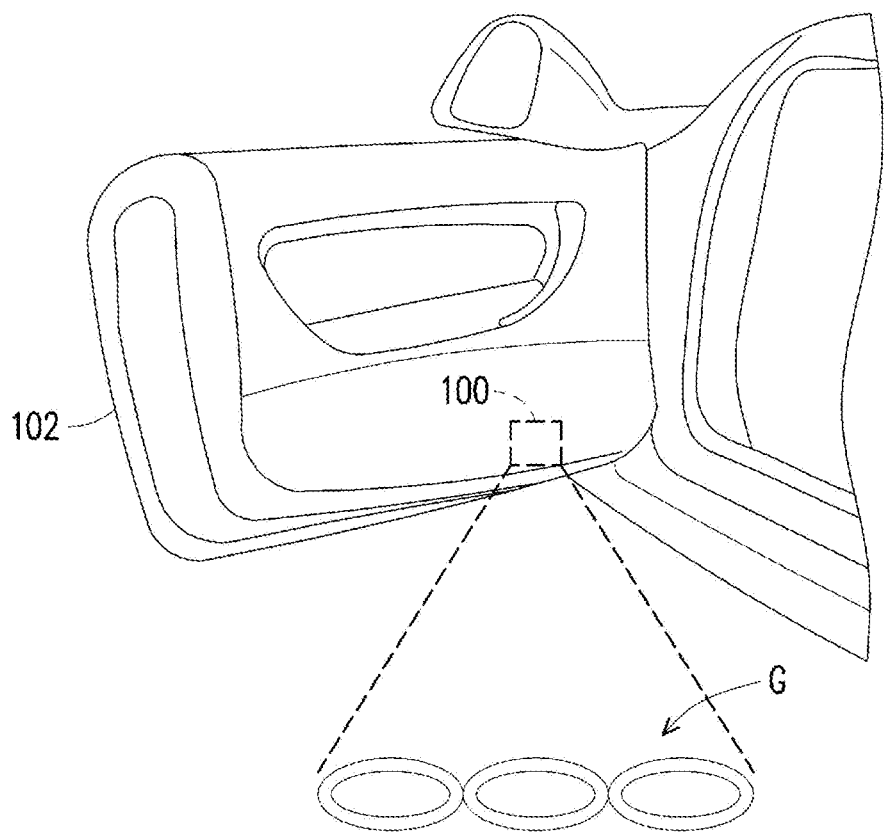
FIG. 1 is a schematic diagram illustrating activation of a projection device when a door of a vehicle is opened according to an embodiment of the invention.

FIG. 1 is a schematic diagram illustrating activation of a projection device when a door of a vehicle is opened according to an embodiment of the invention. With reference to FIG. 1, a projection device 100 is adapted to be disposed on a vehicle 102, for instance, on a door of the vehicle 102 (as shown in FIG. 1), at a rear-view mirror mounted on the door (or an A-pillar), or at a position below the front and rear fenders, which should however not be construed as limitations to the invention. When the door is opened (or when there is another activation device, such as a sensor key or the like), the projection device 100 starts to perform the illumination function and projects an image on a projection plane G, thus not only providing illumination for passengers or the driver to pay attention to the ground conditions but also rendering light and shadow effects. In FIG. 1, the projection plane G is the ground.

Figure 2:
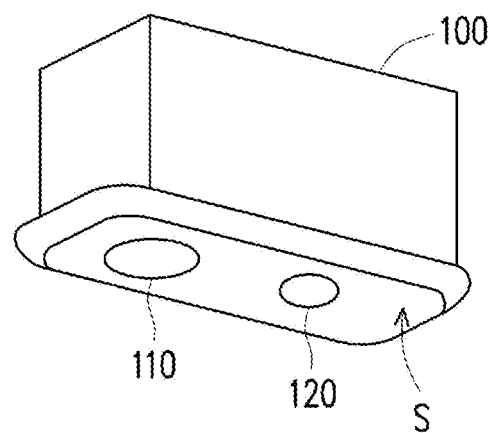
FIG. 2 is a schematic diagram illustrating the appearance of a projection device according to an embodiment of the invention.
Figure 3:
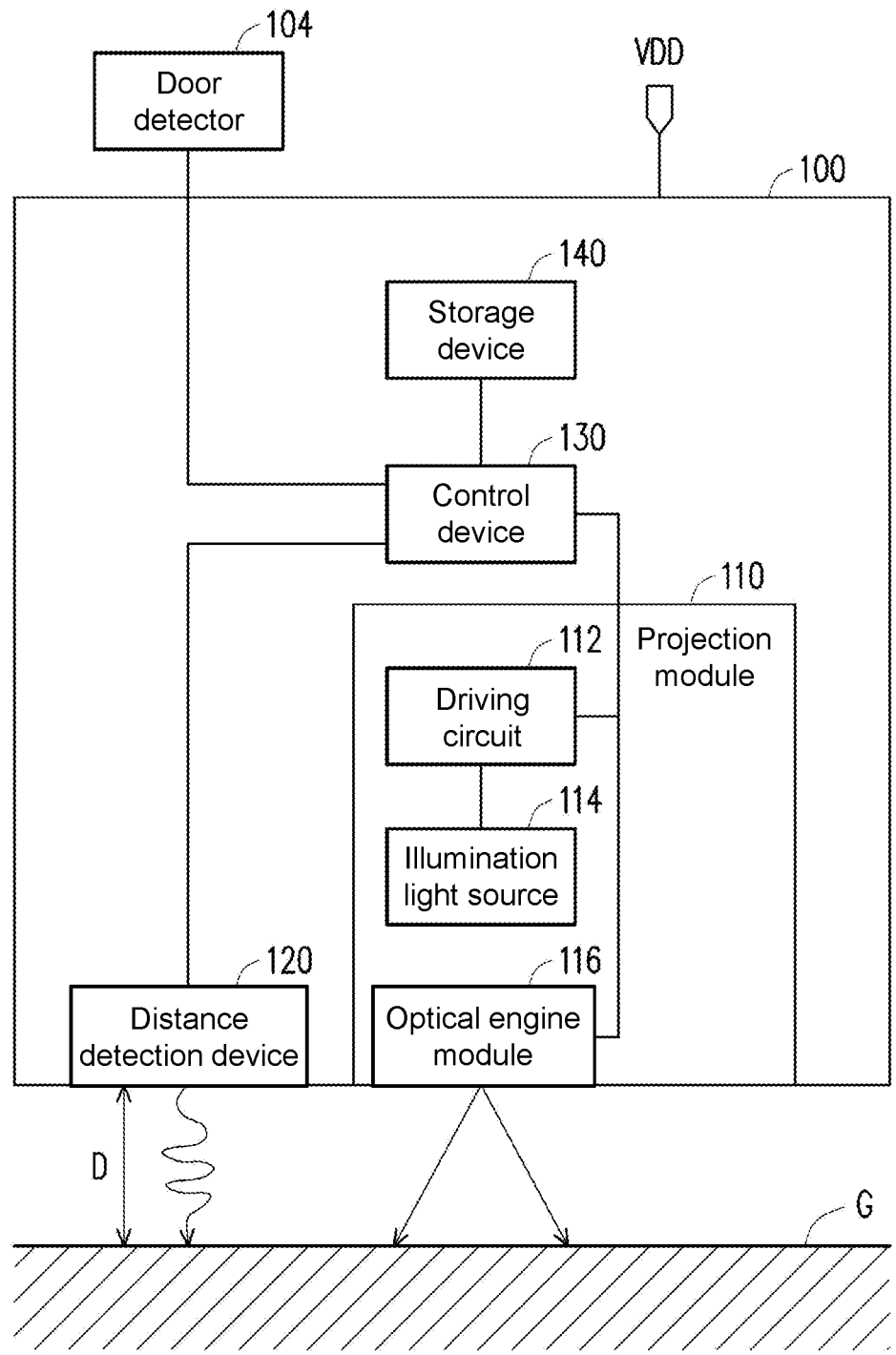
FIG. 3 is a block diagram of a projection device according to an embodiment of the invention.

FIG. 2 is a schematic diagram illustrating the appearance of a projection device according to an embodiment of the invention, and FIG. 3 is a block diagram of a projection device according to an embodiment of the invention. With reference to FIG. 1, FIG. 2, and FIG. 3, the projection device 100 includes at least one projection module 110, a distance detection device 120, a control device 130, and a storage device 140. The projection module 110 is configured to generate at least one projection image on the projection plane G. The distance detection device 120 is configured to measure a projection distance D from the distance detection device 120 to the projection plane G. The projection module 110 and the distance detection device 120 may be disposed together in the projection device 100, and an image beam projected by the projection module 110 passes through a surface S facing the projection plane G to present an image on the projection plane G. The distance detection device 120 projects a detection beam or sound wave from the surface S, such that the projection distance D measured by the distance detection device 120 is also the distance between the projection module 110 and the projection plane G. The storage device 140 is configured to store image data corresponding to the projection image. The control device 130 is electrically connected to the storage device 140, the projection module 110, and the distance detection device 120. The control device 130 is configured to enable the projection module 110 to project at least one projection image and control a brightness or a size of the at least one projection image according to the corresponding projection distance D. Here, the image data in the storage device 140 are, for instance, video data or a plurality of pictures, and the projection device 100 may project one or more projection images of different contents, such as a trademark or an advertisement picture. In an embodiment, the projection device 100 may project a video clip.

In the present embodiment, the projection device 100 may be activated by opening the door of the vehicle 102, and power VDD of the projection device 100 comes from the vehicle 102. The control device 130 is electrically connected to a door detector 104 on the vehicle 102, and the control device 130 may activate the projection device 100 according to a door-opening signal provided by the door detector 104. When the door of the vehicle 102 is opened, the projection device 100 automatically projects an image. The door detector 104 is, for instance, a mechanical switch or an optical shielding detector for detecting whether the door of the vehicle 102 is opened.

Specifically, the projection module 110 is, for instance, a projection module having a light valve, and the light valve is, for instance, a reflective liquid crystal on silicon (LCOS) device or a digital micro-mirror device (DMD), or a transmissive transparent liquid crystal panel. The distance detection device 120 is, for instance, a proximity sensor and can perform distance detection through infrared ray, laser, ultrasonic waves, sound waves, photoelectric sensing, and the like. The control device 130 is, for instance, a device with computation capabilities, such as a central processing unit (CPU), a microprocessor, or a combination thereof. The storage device 140 is, for instance, any type of fixed or movable random access memory (RAM), read-Only memory (ROM), flash memory, hard disk, any other similar device, or a combination thereof. In addition to storing the image data, the storage device 140 may also store various programs, parameters, or threshold values required for the operation of the projection device 100.

In this embodiment, the control device 130 may calculate an estimated size of the projection image according to the projection distance D, an image aspect ratio, and a throw ratio of the projection module 110. The throw ratio is a ratio of the projection distance D to a width W of the projection image, and the image aspect ratio is a ratio of the width W to the height H of the projection image. In detail, since doors of different vehicle models have different height designs, the projection distance D may change depending on the model of the vehicle 102 where the projection device 100 is disposed or depending on the terrain where the vehicle 102 is parked. As the projection distance D changes, the control device 130 may estimate the estimated size of the projection image at different projection distances D according to the preset/default image aspect ratio and the throw ratio of the projection module 110.

Figure 4:
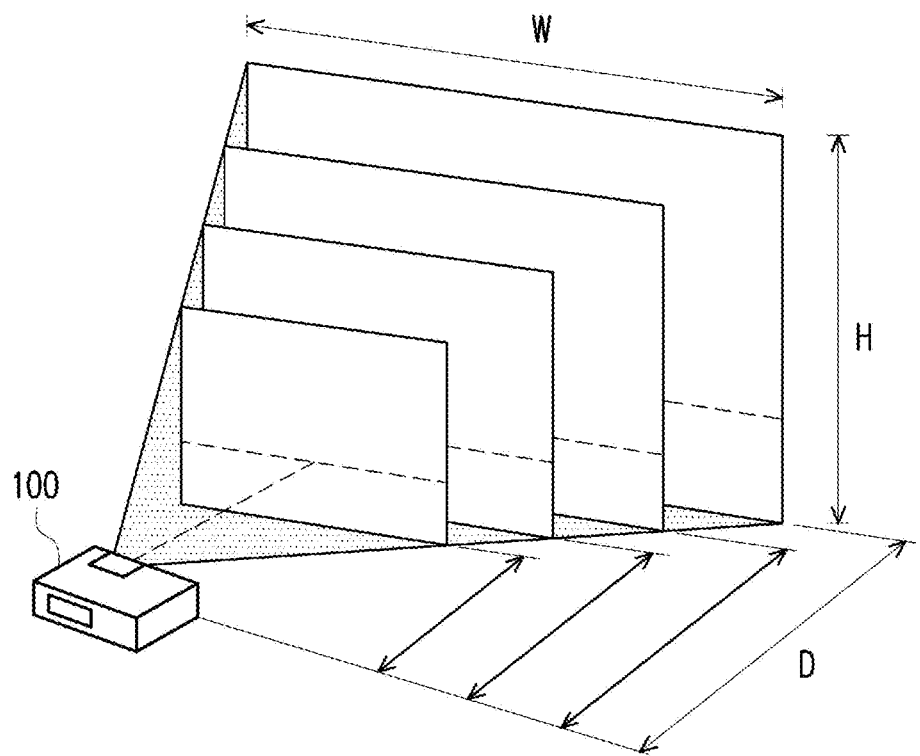
FIG. 4 is a schematic diagram illustrating an estimated size and a projection distance of a projection image according to an embodiment of the invention.

FIG. 4 is a schematic diagram illustrating an estimated size and a projection distance of a projection image according to an embodiment of the invention. As shown in FIG. 4, generally speaking, the farther the projection distance D is, the larger the estimated size is.

Specifically, the control device 130 of the projection device 100 controls the projection module 110 to change the size of the projection image from the estimated size to a desired size through digital zooming or optical zooming, so that the size of the projection image may substantially stay at the desired size. Here, the desired size has a predetermined and constant value that does not change with the projection distance D. As such, if the projection device 100 projects a LOGO, regardless of the model of the vehicle 102 where the projection device 100 is disposed or the terrain where the passengers or the driver gets out of the vehicle 102, the LOGO projected by the projection device 100 has substantially the same size which is not changed with the projection distance D. Here, the digital zooming is to change the size of the projection image by means of software or hardware and application programs, and the optical zooming is to change the size of the projection image by adjusting positions of a plurality of physical lenses.

In addition, the control device 130 also calculates an estimated brightness of the projection image based on the estimated size. When the estimated brightness is greater than a first brightness threshold value, the brightness of the projection image projected by the projection module 110 is controlled to be not greater than the first brightness threshold value by the control device 130. In an embodiment, the control device 130 also controls the brightness of the projection image projected by the projection module 110 to be not less than a second brightness threshold. That is, after the control device 130 calculates the estimated brightness and the estimated size corresponding to the projection distance D, the luminous flux emitted by the projection module 110 is adjusted according to the estimated brightness by the control device 130 to prevent the brightness of the projection image from being overly bright or overly dark.

Specifically, the projection module 110 of the projection device 100 further includes a driving circuit 112, an illumination light source 114, and an optical engine module 116. The control device 130 is electrically connected to the driving circuit 112, and the driving circuit 112 is electrically connected to the illumination light source 114 and configured to provide a driving current to the illumination light source 114. The driving circuit 112 is, for instance, a light source driving circuit, and the illumination light source 114 is, for instance, a solid-state light source (e.g., a light emitting diode, a laser diode) or a lamp. The control device 130 is electrically connected to the optical engine module 116 and configured to provide image data to the optical engine module 116 to generate the image beam described above. The optical engine module 116 includes, for instance, a light valve of a reflective type or a transmissive type. The reflective light valve is, for instance, an LCOS device or a DMD, and the transmissive light valve is, for instance, a transparent liquid crystal panel.

The control device 130 adjusts a pulse duty ratio or a current value of the driving current through the driving circuit 112 according to the projection distance D, so as to adjust the brightness of the image projected by the projection module 110 on the projection plane G.

In an embodiment, the throw ratio of the projection module 110 is set as 1.147, and the image aspect ratio is preset as 16:9. The control device 130 aims at keeping the size and the brightness of the projection image projected by the projection module 110. The diagonal size of the projection image is intended to be fixed at around 20 cm, and the brightness is intended to be kept at around 113 nits. The first brightness threshold value is set as 118 nits, and the second brightness threshold is set as 108 nits. Table 1 records the estimated size and the estimated brightness while the projection distances D are different and the actual size and the actual brightness of the projection image on the projection plane G adjusted by the control device 130.

TABLE 1

| Projection distance (cm) | Estimated size/ diagonal (cm) | Estimated brightness (Nits) | Actual size/ diagonal (cm) | Actual brightness (Nits) |
| --- | --- | --- | --- | --- |
| 20 | 20.01 | 450 | 20.01 | 113 |
| 30 | 30.01 | 200 | 20.11 | 114 |
| 40 | 40.01 | 113 | 20.01 | 113 |
| 45 | 45.01 | 89 | 20.25 | 113 |
| ... | ... | ... | ... | ... |

When the projection distance D is 20 cm, the estimated size of the projection image calculated by the control device 130 is 20.01 cm (the diagonal length), which is similar to the desired size, but the estimated brightness reaches 450 nits. The control device 130 may not adjust the size of the image but controls the driving circuit 112 to decrease the driving current, so that the brightness of the projection image on the projection plane G conforms to the desired brightness of 113 nits and less than the first brightness threshold value. When the projection distance D is 30 cm, the estimated size of the projection image calculated by the control device 130 is 30.01 cm (diagonal length), and the estimated brightness is 200 nits. The control device 130 may adjust the size of the projection image through scaler zooming, so that the actual size of the projection image finally projected on the projection plane G is 20.11 cm, which is substantially fixed at the desired size. The control device 130 may also reduce the brightness of the projection image on the projection plane G by controlling the driving circuit 112, so that the actual brightness of the projection image is 114 nits, which is less than the first brightness threshold value. When the projection distance D is 40 cm, the estimated size of the projection image calculated by the control device 130 is 40.01 cm (diagonal length), and the estimated brightness is 113 nits. The control device 130 may change the size of the projection image from 40.01 cm to 20.01 cm through digital zooming or optical zooming without changing the luminous flux of the illumination light source 114. When the projection distance D is 45 cm, the estimated size of the projection image calculated by the control device 130 is 45.01 cm (diagonal length), and the estimated brightness is 89 nits, which is less than the second brightness threshold. The control device 130 may control the driving circuit 112 to increase the driving current, such that the brightness of the projection image projected on the projection plane G is greater than or equal to the second brightness threshold but still less than the first brightness threshold value. The adjusted actual brightness is 113 nits. In another embodiment, the control device 130 may also decide not to increase the driving current.

In the present embodiment, the projection device 100 may measure the projection distance D by means of the distance detection device 120, and the control device 130 calculates the corresponding estimated size and the corresponding estimated brightness according to the projection distance D. Given the illumination light source 114 provides the same luminous flux, the smaller the projection distance D is, the smaller the estimated size, and the greater the corresponding estimated brightness is. Therefore, when the projection distance D is less than a distance threshold value, the control device 130 may control the projection module 110 to ensure that the brightness of the projection image does not exceed the first brightness threshold value, thus achieving the energy saving effect. According to Table 1, the distance threshold value provided in this embodiment may be 40 cm.

Figure 5:
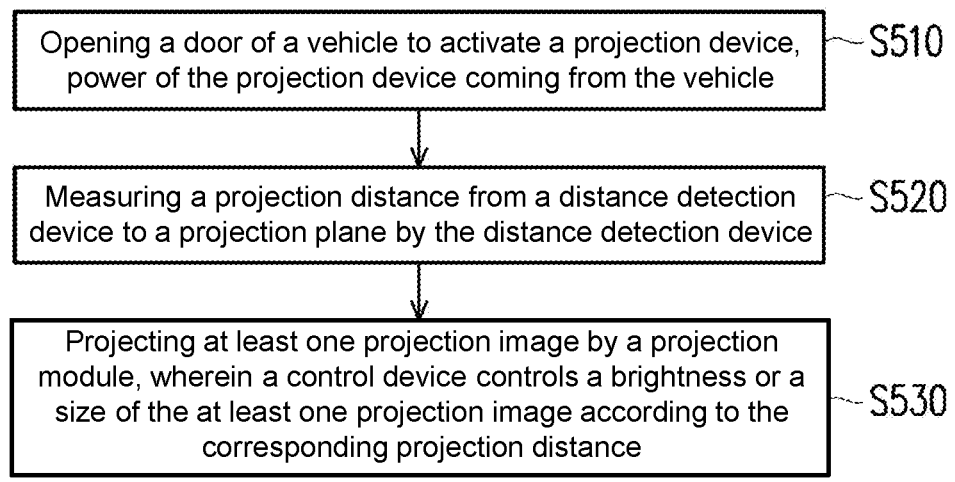
FIG. 5 is a flowchart illustrating a control method of a projection device according to an embodiment of the invention.

FIG. 5 is a flowchart illustrating a control method of a projection device according to an embodiment of the invention. The projection device illustrated in FIG. 5 is adapted to be disposed on the vehicle, e.g., at the door or the rear-view mirror. Hence, the control method provided may be applicable to the embodiments illustrated in FIG. 1 to FIG. 4.

With reference to FIG. 5, according to the embodiment, in step S510, a door of a vehicle is opened to activate a projection device, and power of the projection device comes from the vehicle. In step S520, when the door is opened and the projection device is activated, a projection distance from a distance detection device to a projection plane is measured by the distance detection device. Next, in step S530, at least one projection image is projected by a projection module, wherein a control device controls a brightness or a size of the at least one projection image according to the corresponding projection distance. Since people skilled in the art can obtain sufficient suggestions, teachings, or explanations according to the above embodiments, details will not be further described hereinafter.

To sum up, the projection device and the control method thereof as provided in one or more embodiments of the invention may measure the projection distance from the projection device to the projection plane, calculate the estimated size and the estimated brightness of the projection image according to the projection distance, and control the brightness or the size of the projection image according to the corresponding estimated size and the corresponding estimated brightness. As such, the size of the actual projection image of the projection device may stay constant, the overall projection image effect remains consistent, the brightness of the projection image may be maintained at a level suitable for users to watch, and eye fatigue of the users can be avoided. Meanwhile, the effect of power saving can be accomplished, and through the control of the size of the projection image, the overall brightness and the size of the projection image can remain consistent.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection device adapted to be disposed on a vehicle and comprising a storage device, a projection module, a distance detection device, and a control device, wherein the storage device is configured to store image data of at least one projection image, the distance detection device is configured to measure a projection distance from the distance detection device to a projection plane, and the control device is electrically connected to the storage device, the projection module, and the distance detection device and configured to enable the projection module to project the at least one projection image and control a brightness or a size of the at least one projection image according to a corresponding projection distance, wherein the projection device is activated by opening a door of the vehicle, and power of the projection device comes from the vehicle, wherein the control device uses projection parameters including the projection distance, an image aspect ratio, and a throw ratio of the projection module to calculate an estimated size of the at least one projection image, so as to adjust the brightness of the at least one projection image to a desired brightness based on the estimated size of the at least one projection image, wherein the throw ratio is a ratio of the projection distance to a width of the at least one projection image.

2. The projection device according to claim 1, wherein and the control device controls the projection module to change the size of the at least one projection image from the estimated size to a desired size through digital zooming or optical zooming, so that the size of the at least one projection image stays at the desired size.

3. The projection device according to claim 2, wherein the control device calculates an estimated brightness of the at least one projection image according to the estimated size, and when the estimated brightness is greater than a first brightness threshold value, the brightness of the at least one projection image projected by the projection module is controlled not to be greater than the first brightness threshold value by the control device.

4. The projection device according to claim 3, wherein the brightness of the at least one projection image projected by the projection module is controlled to be not less than a second brightness threshold by the control device.

5. The projection device according to claim 1, further comprising:

a driving circuit electrically connected to the control device and an illumination light source in the projection module and configured to provide a driving current to the illumination light source, wherein the control device adjusts a current value or a pulse duty ratio of the driving current through the driving circuit according to the projection distance.

6. The projection device according to claim 5, wherein when the projection distance is less than a distance threshold value, the control device controls the projection module to ensure the brightness of the at least one projection image not to exceed a first brightness threshold value.

7. The projection device according to claim 1, wherein the number of the at least one projection image is plural, or the image data are video data.

8. A control method of a projection device, wherein the projection device is adapted to be disposed on a vehicle and at least comprises a distance detection device, a control device, and a projection module, and the control method comprises:

opening a door of the vehicle to activate the projection device, power of the projection device coming from the vehicle;

measuring a projection distance from the distance detection device to a projection plane by the distance detection device;

projecting at least one projection image through the projection module, controlling a brightness or a size of the at least one projection image according to a corresponding projection distance by the control device; and using projection parameters including the projection distance, an image aspect ratio, and a throw ratio of the projection module to calculate an estimated size of the at least one projection image by the control device, so as to adjust the brightness of the at least one projection image to a desired brightness based on the estimated size of the at least one projection image, wherein the throw ratio is a ratio of the projection distance to a width of the at least one projection image.

9. The control method according to claim 8, wherein the step of controlling the brightness or the size of the at least one projection image according to the corresponding projection distance by the control device comprises:

changing the estimated size to a desired size of the at least one projection image through digital zooming or optical zooming, so that the size of the at least one projection image stays at the desired size.

10. The control method according to claim 9, wherein the step of controlling the brightness or the size of the at least one projection image according to the corresponding projection distance by the control device further comprises:

calculating an estimated brightness of the at least one projection image according to the estimated size, and when the estimated brightness is greater than a first brightness threshold value, the brightness of the at least one projection image projected by the projection module is controlled to be not greater than the first brightness threshold value by the control device.

* * * * *